(12) United States Patent
Kornfält et al.

(10) Patent No.: US 6,805,951 B2
(45) Date of Patent: Oct. 19, 2004

(54) PROCESS FOR THE PRODUCTION OF A FLOOR STRIP

(75) Inventors: Sven Kornfält, Malmö (SE); Per Bengtsson, Ekeby (SE); Hans Sjölin, Perstorp (SE)

(73) Assignee: Pergo (Europe) AB, Trelleborg (SE)

( * ) Notice: Subject to any disclaimer, the term of this patent is extended or adjusted under 35 U.S.C. 154(b) by 97 days.

(21) Appl. No.: 10/360,802

(22) Filed: Feb. 10, 2003

(65) Prior Publication Data

US 2003/0118812 A1 Jun. 26, 2003

Related U.S. Application Data

(63) Continuation of application No. 08/817,391, filed as application No. PCT/SE95/01206 on Oct. 17, 1995, now Pat. No. 6,517,935.

(30) Foreign Application Priority Data

Oct. 24, 1994 (SE) .............................................. 9403620

(51) Int. Cl.[7] ................................................. B32B 5/16
(52) U.S. Cl. ....................... 428/331; 428/332; 428/526; 428/531; 428/918; 156/250; 156/276
(58) Field of Search ................................. 428/331, 332, 428/526, 531, 918; 156/250, 276

(56) References Cited

U.S. PATENT DOCUMENTS

| 3,671,369 A | 6/1972 | Kvalheim et al. |
| 4,198,455 A | 4/1980 | Spiro et al. |
| 4,504,347 A | 3/1985 | Munk et al. |
| 4,643,237 A | 2/1987 | Rosa |
| 5,034,272 A | 7/1991 | Lindgren et al. |
| 6,517,935 B1 | 2/2003 | Kornfalt et al. |

FOREIGN PATENT DOCUMENTS

| SE | 467150 B | 6/1992 |
| WO | 9612857 | 5/1996 |

*Primary Examiner*—Edmund H. Lee
(74) *Attorney, Agent, or Firm*—Stevens, Davis, Miller & Mosher, L.L.P.

(57) ABSTRACT

A thin abrasion resistant decorative thermosetting laminate of postforming quality is glued to a longitudinal carrier. The carrier preferably consists of a fibre board or a particle board with a rectangular cross section and at least two opposite rounded-off edges. One or more floor strips with the same or different cross section is machined from the laminate clad carrier.

11 Claims, 4 Drawing Sheets

PROCESS FOR THE PRODUCTION OF A FLOOR STRIP

CROSS-REFERENCE TO RELATED APPLICATIONS

Figure 1:
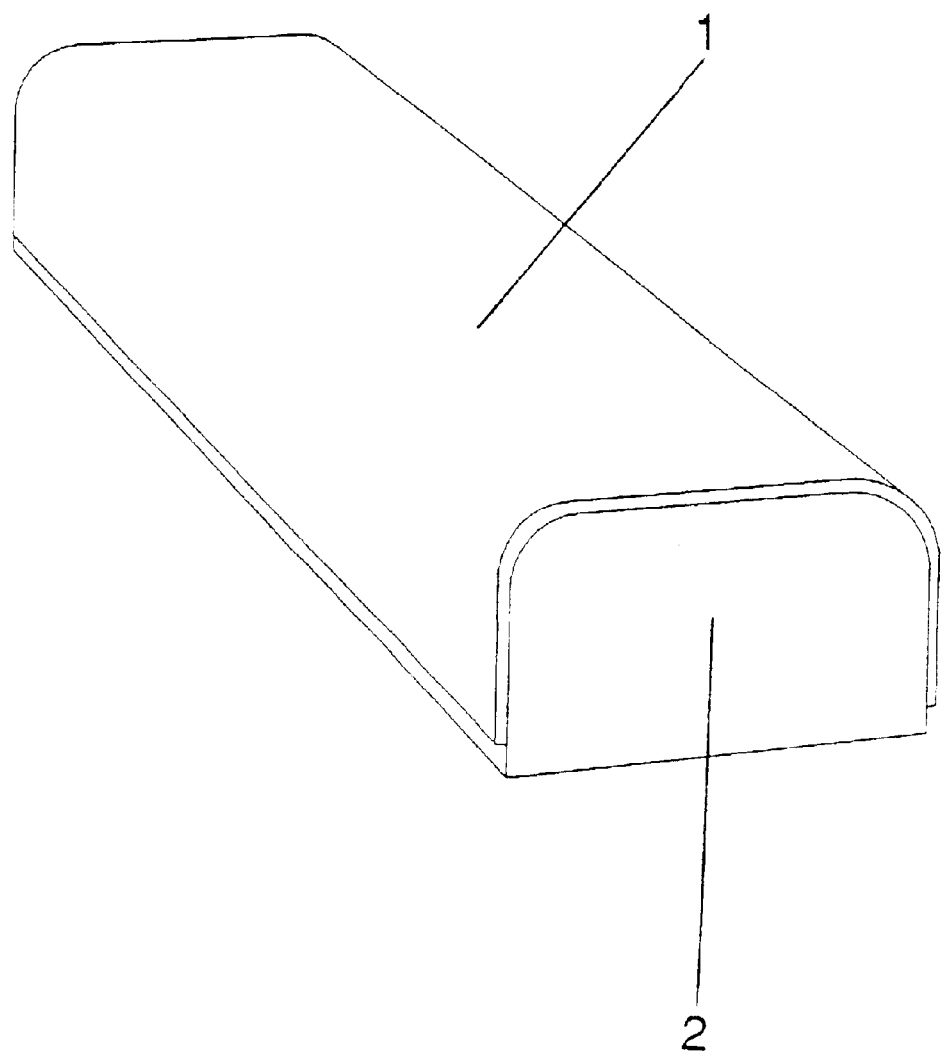

This application is a continuation application of U.S. application Ser. No. 08/817,391, filed Apr. 25, 1997, now U.S. Pat. No. 6,517,935 which, in turn is a §371 application of PCT/SE95/01206, filed Oct. 17, 1995, claiming the priority of Swedish Application No. 9403620-9, filed Oct. 24, 1994, the entire disclosures of which are incorporated herein in their entirety.

The present invention relates to a process for the production of a floor strip such as a dilatation profile, a transition profile or a finishing profile.

It is previously known to produce floor strips such as metal strips, wood veneer coated strips and strips of homogeneous wood.

There is a strong desire to bring about a floor strip with the same pattern as on a floor of thermosetting laminate. During the last years these floors have become very usual. For instance they are made with wood pattern, marble pattern and phantasy pattern. Possibly you can use a homogeneous wood strip or a wood veneer coated strip for a few of the wood patterned floors. Previously known strips do not go well together with all the other floor patterns.

In addition the purpose of the present invention is to provide a floor strip with improved abrasion resistance.

According to the present invention it has quite surprisingly been possible to meet the above needs and bring about a process for the production of floor strips such as a dilatation profile, a transition profile or a finishing profile. The process comprises glueing, preferably under heat and pressure a thin decorative thermosetting laminate of postforming quality having an abrasion resistance measured as IP-value >3000 revolutions, preferably >6000 revolutions, on a longitudinal carrier, which carrier preferably consists of a fibre board or a particle board with a rectangular cross-section and at least two opposite rounded-off edges. The postforming laminate is glued in one piece on the upper side and two long sides of the carrier via the rounded-off edges, whereupon one or more floor profiles having the same or different cross-section is machined from the laminate coated carrier.

According to one embodiment the carrier can be provided with a rectangular cross-section with three rounded-off edges.

One great advantage of the process for the production according to the invention is that it is very rational. From the same body, the laminate clad carrier, several profiles with varying shape can be machined. Usually a milling machine is used for machining the different kinds of profiles from the laminate coated carrier.

Preferably the carrier is water resistant. At a preferred embodiment the carrier consists of a high density fibre board made of fine fibres.

At a preferred embodiment the postforming laminate is glued in one piece on three of the four longitudinal sides of the carrier, preferably on the upper side and two long sides via the rounded-off edges. Advantageously, a heat and moisture resistant glue is used at the glueing. Preferably the glueing is carried out under heat and pressure. For instance the pressure can be regulated by means of rollers which press the laminate against the carrier. The temperature can for instance be regulated with heating nozzles which can give an even current of warm air.

At another embodiment the carrier can be provided with a rectangular cross-section and three rounded-off edges. The postforming laminate is then glued in one piece on all four sides of the carrier via the rounded-off edges.

Suitably the postforming laminate consists of at least one monochromatic or patterned paper sheet impregnated with a thermosetting resin, preferably melamine-formaldehyde resin and preferably one or more sheets for instance of parchment, vulcanized fibres or glass fibres. The last mentioned sheets are preferably not impregnated with any thermosetting resin, but the thermosetting resin from the sheets situated above will enter these sheets at the laminating step, where all sheets are bonded together.

Generally the term postforming laminate means a laminate which is so flexible that it can be formed at least to a certain extent after the production thereof. Ordinary qualities of thermosetting decorative laminates are rather brittle and cannot be regarded as postforming laminates.

Usually the postforming laminate includes at least one uppermost transparent paper sheet made of α-cellulose and impregnated with a thermosetting resin, preferably melamine-formaldehyde resin. This so-called overlay is intended to protect an underlying decor sheet from abrasion.

Often at least one of the paper sheets of the postforming laminate impregnated with thermosetting resin, preferably the uppermost one is coated with hard particles for instance silica. aluminium oxide and/or silicon carbide with an average particle size of about 1–80 $\mu$m, preferably about 5–60 $\mu$m evenly distributed over the surface of the paper sheet.

In a preferred embodiment the hard particles are applied on the resin impregnated paper surface before the resin has been dried.

The hard particles improve the abrasion resistance of the laminate. Hard particles are used in the same way at the production of laminates which are subject to a hard wear such as flooring laminates.

The abrasion resistance of the postforming laminates are tested according to the European standard EN 438-2/6:1991. According to this standard the abrasion of the decor sheet of the finished laminate to the so-called IP-point (initial point) is measured, where the starting abrasion takes place.

The IP-value suitably lies within the interval 3000–20000, preferably 3000–10000 revolutions.

Thus, the manufacturing process according to the invention makes it possible to produce laminate clad profiles with the same surface pattern and about the same abrasion resistance as the laminate floorings they are intended to go together with.

Of course the pattern of the profiles can also be adapted to other flooring materials than laminate floorings, such as parquette floorings and soft plastic floorings.

The present invention will be explained further in connection with the embodiment example below and the enclosed figures of which FIG. 1 shows a postforming laminate 1 glued to a longitudinal carrier 2.

Figure 2:
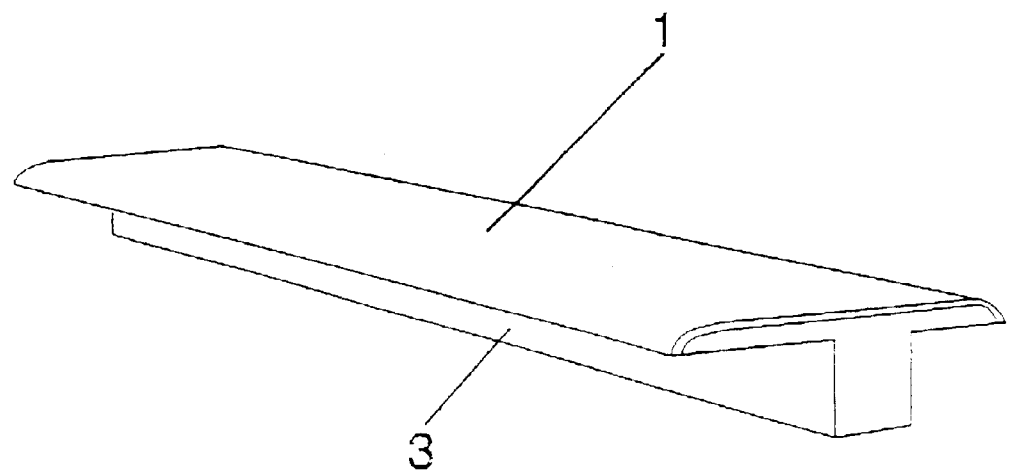
Figure 3:
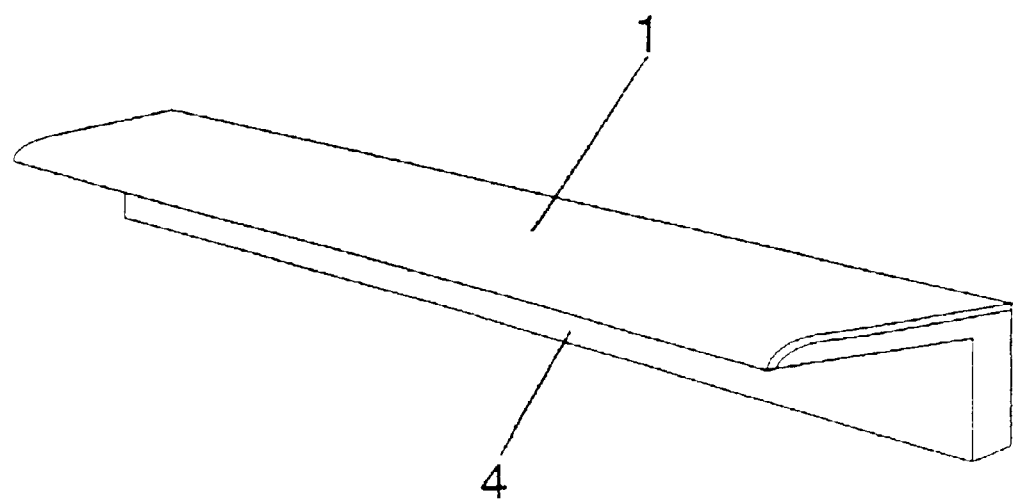
Figure 4:
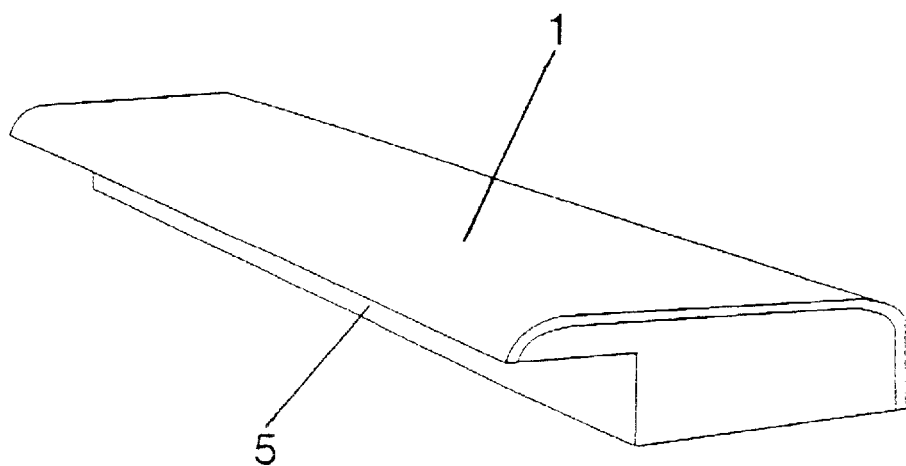

FIG. 2 shows a dilatation profile 3 with a postforming laminate 1 glued thereto, while FIG. 3 illustrates a finishing profile 4 with a postforming laminate 1 glued thereto. Finally FIG. 4 shows a transition profile 5 with a postforming laminate 1 glued thereto.

On the figures the thickness of the postforming laminate 1 has been magnified as compared to the size of the carrier 2 and the profiles 3–5 respectively to better illustrate that a postforming laminate 1 is glued to the carrier 2 and the profiles 3–5 respectively.

Of course the FIGS. 1–4 only show one embodiment of the carrier 2 and the profiles 3–5 respectively which can be produced according to the invention. Various other designs are possible.

EXAMPLE

A roll of transparent so-called overlay paper of α-cellulose with a surface weight of 25 g/m² was impregnated with an aqueous solution of melamine-formaldehyde resin to a resin content of 70 percent by weight calculated on dry impregnated paper. Immediately after the impregnation, aluminium oxide particles with an average particle size of 50 µm were applied to the upper side of the paper in an amount of 7 g/m² by means of a doctor-roll placed above the paper web.

Thus, the hard aluminium particles were applied in the melamine-formaldehyde resin which had not been dried yet.

The impregnated paper web was then fed continuously into a heating oven, where the solvent was evaporated. At the same time the resin was partially cured to so-called B-stage. Thereby the aluminium oxide particles were enclosed in the resin layer and accordingly concentrated to the surface of the product obtained which is usually called prepreg. The prepreg web obtained was then rolled again.

A roll of conventional nontransparent so-called decor paper with a decor pattern printed thereon and having a surface weight of 80 g/m² was treated in the same way as the overlay paper except for the fact that no aluminium oxide particles were applied and that the resin content was 50 percent by weight calculated on dry impregnated paper.

A roll of unimpregnated parchment with a surface weight of 120 g/m² was used at the production of the postforming laminate.

The two prepreg webs impregnated with melamine-formaldehyde resin and the unimpregnated parchment web were pressed between two press bands, of a continuous laminating press to a decorative postforming laminate.

At the pressing a prepreg web of α-cellulose was placed on top with the side with the hard particles directed upwards. Underneath followed a prepreg web of decor paper and at the bottom a web of parchment. The prepreg webs and the parchment web were pressed together at a pressure of 35 kp/cm² and at a temperature of 170° C.

The decorative postforming, laminate obtained was cut with roller knives to strips of suitable length and width.

A longitudinal carrier 2 with a rectangular cross-section and two opposite rounded-off edges according to FIG. 1 was machined from a fibre board by means of a milling machine. The fibre board was a water resistant board of so-called MDF-quality (medium density fibre board quality) of high density made of finely divided fibres.

A strip of postforming laminate 1 was glued under heat and pressure to the longitudinal carrier 2 with a heat and moisture resistant glue. The pressure was regulated with rolls which pressed the laminate against the carrier and the temperature was regulated with heating nozzles which blew an even current of warm air.

A dilation profile 3 according to FIG. 2 was machined from the laminate clad carrier by milling.

Instead two finishing profiles 4 according to FIG. 3 or one transition profile 5 according to FIG. 4 can be produced from the same carrier. This results in a rational and cost-saving production.

The abrasion resistance of the postforming laminate obtained was measured. Then a value for the IP-point amounting to 7000 revolutions was obtained.

The present invention is not limited to the embodiments disclosed, since these can be modified in different ways within the scope of the present invention.

What is claimed is:

1. A process for the production of a floor strip, said process comprising gluing a thin decorative thermosetting laminate of postforming quality comprising hard particles which impart an abrasion resistance to the laminate, measured as an IP value, on a longitudinal carrier, which carrier consists of at least one member selected from the group consisting of fiber board and a particle board, said carrier having a rectangular cross-section and at least two opposite rounded-off edges, wherein, in said gluing step the thermosetting laminate of postforming quality in one piece is glued on an upper side and on two long sides of the carrier via the rounded-off edges to form a laminate coated carrier, and subsequently machining said laminate coated carrier into one or more floor profiles, which may be the same or different cross-section, said profiles being selected from the group consisting of dilation profile, transition profile and finishing profile, from the laminate coated carrier to produce a floor strip.

2. Process according to claim 1, wherein the postforming laminate comprises at least one monochromatic or patterned paper sheet impregnated with a thermosetting resin, and one or more sheets comprising parchment, vulcanized fibres or glass fibres which are not impregnated with a thermosetting resin.

3. Process according to claim 1, wherein the postforming laminate includes at least one uppermost transparent paper sheet overlay of α-cellulose impregnated with a thermosetting resin.

4. Process according to claim 1, wherein the IP-value lies with the interval 3000–6000 revolutions.

5. The process according to claim 1, comprising providing a water resistant carrier as the carrier.

6. The process according to claim 1, wherein the thin decorative thermosetting laminate of postforming quality comprises at least one paper sheet impregnated with a thermosetting resin and at least the upper most sheet of said thin decorative thermosetting laminate being coated with hard particles selected from the group consisting of silica, aluminum oxide, silicon carbide and combinations thereof, having an average particle size of 1–80 µm, evenly distributed over the surface of the paper sheet.

7. Process according to claim 1, wherein the glueing step is carried out under heat and pressure.

8. Process according to claim 3, wherein the overlay is impregnated with melamine-formaldehyde resin.

9. Process according to claim 1, wherein the IP-value lies within interval 6000–20000 revolutions.

10. Process according to claim 6, wherein the average particle size is about 5–60 µm.

11. The product produced by the process of claim 1.

* * * * *

US006805951C1

(12) EX PARTE REEXAMINATION CERTIFICATE (5630th)
United States Patent
Kornfalt et al.

(10) Number: US 6,805,951 C1
(45) Certificate Issued: Dec. 5, 2006

(54) PROCESS FOR THE PRODUCTION OF A FLOOR STRIP

(75) Inventors: Sven Kornfalt, Malmo (SE); Per Bengtsson, Ekeby (SE); Hans Sjolin, Perstorp (SE)

(73) Assignee: Pergo (Europe) AB, Trelleborg (SE)

Reexamination Request:
No. 90/007,526, Apr. 27, 2005

Reexamination Certificate for:
Patent No.: 6,805,951
Issued: Oct. 19, 2004
Appl. No.: 10/360,802
Filed: Feb. 10, 2003

Related U.S. Application Data

(63) Continuation of application No. 08/817,391, filed as application No. PCT/SE95/01206 on Oct. 17, 1995, now Pat. No. 6,517,935.

(51) Int. Cl.
*B32B 5/16* (2006.01)

(52) U.S. Cl. .................. 428/331; 428/332; 428/526; 428/531; 428/918; 156/250; 156/276

(58) Field of Classification Search ............... 156/62.2, 156/250, 62.8, 245, 276; 428/331, 526, 531, 428/918
See application file for complete search history.

(56) References Cited

U.S. PATENT DOCUMENTS

| | | | |
|---|---|---|---|
| 1,966,020 A | 7/1934 | Rowley | |
| 3,296,056 A * | 1/1967 | Bechtold | .................. 156/461 |
| 3,339,329 A | 9/1967 | Berg | |
| 3,696,461 A | 10/1972 | Kelly | |
| 3,953,661 A | 4/1976 | Gulley | |
| 4,059,933 A | 11/1977 | Funk et al. | |
| 4,198,455 A * | 4/1980 | Spiro et al. | .................. 156/245 |
| 4,504,347 A * | 3/1985 | Munk et al. | ................. 156/245 |
| 4,520,062 A | 5/1985 | Ungar et al. | |
| 4,653,138 A | 3/1987 | Carder | |
| 4,940,503 A * | 7/1990 | Lindgren et al. | ........... 156/279 |
| 5,034,272 A * | 7/1991 | Lindgren et al. | ........... 428/331 |
| 5,155,952 A | 10/1992 | Herwegh et al. | |
| 5,581,967 A | 12/1996 | Glatz | |
| 5,688,569 A | 11/1997 | Gilmore et al. | |
| 5,695,875 A | 12/1997 | Larsson et al. | |
| 5,706,623 A | 1/1998 | Brown | |
| 6,230,385 B1 | 5/2001 | Nelson | |
| 6,745,534 B1 | 6/2004 | Kornfalt et al. | |

FOREIGN PATENT DOCUMENTS

SE 467150 B 6/1992
WO 9612857 5/1996

OTHER PUBLICATIONS

Vila, Bob, Bob Vilas's Workshop: The Ultimate Illustrated Handbook for the Home Workshop, William Morrow and Company, Inc., published Oct. 5, 1994, pp. 107–112.*
Sweet's Catalog File: Products for General Building and Renovation, McGraw–hill information Systems Company, published Feb. 13, 1986, pp. 18 and 19.*
Floors, Stairs, and Carpets, Time–Life Books, Inc., Jan. 1994, pp. 14–35.*

* cited by examiner

*Primary Examiner*—Stephen Stein

(57) ABSTRACT

A thin abrasion resistant decorative thermosetting laminate of postforming quality is glued to a longitudinal carrier. The carrier preferably consists of a fibre board or a particle board with a rectangular cross section and at least two opposite rounded-off edges. One or more floor strips with the same or different cross section is machined from the laminate clad carrier.

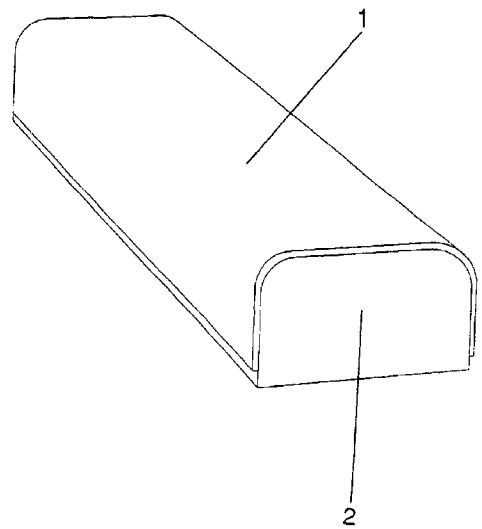

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

* * * * *